Feb. 14, 1933.   A. H. ADAMS   1,897,412
METHOD OF WINDING CONVOLUTED SPRINGS
Original Filed June 12, 1928
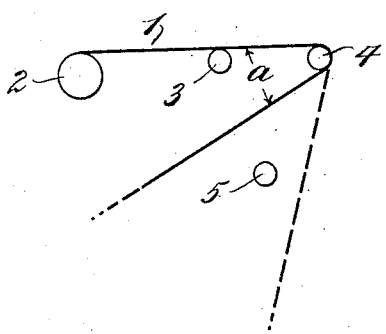
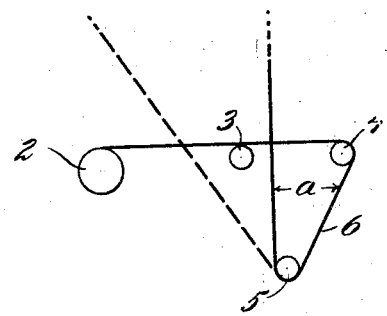
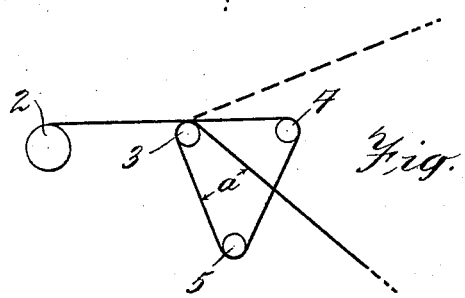
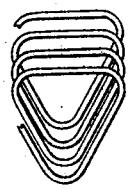
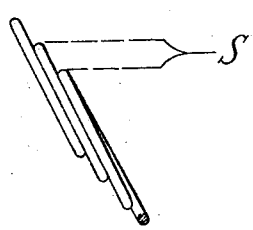
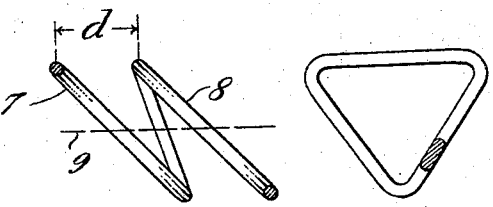
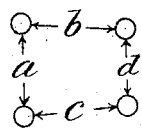
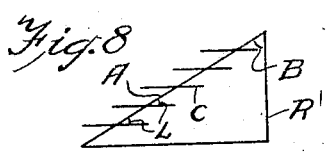
ARTHUR H. ADAMS,
INVENTOR
BY Paul Trolich
ATTORNEY Patented Feb. 14, 1933

1,897,412

UNITED STATES PATENT OFFICE

ARTHUR H. ADAMS, OF YONKERS, NEW YORK, ASSIGNOR TO TROY LAUNDRY MACHINERY COMPANY, INC., OF NEW YORK, N. Y., A CORPORATION OF DELAWARE

METHOD OF WINDING CONVOLUTED SPRINGS

Original application filed June 12, 1928, Serial No. 284,722. Divided and this application filed October 17, 1929. Serial No. 400,304.

This is a division of my copending application, Serial No. 284,722, filed June 12, 1928.

This invention relates to springs and in particular to methods for manufacturing convoluted springs of any desired shape.

In certain classes of machines, for example, in laundry pressing and ironing machines, and the like, it is desirable to provide a padded surface of comparatively high resiliency, relatively long life and which is substantially non-absorbent. It has been found that a convoluted spring having the turns permanently skewed at an angle to the spring axis provides a practical and economical basis for the construction of such a resilient surface.

Accordingly, it is an object of this invention to provide a method of winding a convoluted spring with the individual convolutions thereof inclined to the common axis of the convolutions.

Another object of the invention is to provide a method of winding a spring with the convolutions of any desired shape which, during the winding process, are simultaneously given a permanent set inclining them at an angle to the spring axis, the angle being the angle of skew.

Another feature pertains to the method of manufacturing a skewed convoluted spring by giving definite angular sets at regularly recurring points throughout the length of a spring wire.

Finally, the invention contemplates a new method of manufacturing a convoluted spring which is resilient in an angular direction with respect to the spring axis.

Other features and advantages not enumerated will be apparent after the following detailed description and the appended claims have been considered.

Referring to the drawing, Figs. 1, 2 and 3 schematically represent successive steps to be followed in practicing the fundamental method of winding a spring according to the invention.

Figs. 4, 5 and 6 are views of a spring produced according to the method shown in Figs. 1, 2 and 3; Figs. 4 and 5 showing the spring after it has been wound, and Fig. 6 showing the spring stretched.

Fig. 7 is a schematic diagram showing the manner of spacing the winding pins for the production of a square skewed spring.

Figure 8 is a diagrammatic sketch showing the positioning of the convolutions of a spring produced according to the method shown in Figures 1, 2 and 3, with respect to a reference plane (referred to hereinafter).

For example, it has been found that by taking a length of spring wire and giving it, at predetermined points throughout each unit length thereof, definite angular sets to form convolutions, and to give opposite sides of the respective convolutions thus formed different effective or net heights with respect to a plane which is perpendicular to the plane of the convolution and which forms with the axis of the spring an angle equal to the complement of the angle of skew, and repeating the sets at cyclically recurrent points throughout the succeeding lengths of the wire, that a skewed convoluted spring results. Such a spring has the individual convolutions thereof inclined at an angle of skew to the spring axis and with each convolution having a shape determined by the angular sets throughout each unit length. While it has been chosen to illustrate in the drawing means for winding a skewed spring of triangular shape, it will be understood that a spring of any other shape such as D-shape, square, etc. may be similarly produced.

The term "effective or net height" above referred to, means the perpendicular height, with respect to the plane, to which the opposite sides extend above or below the plane.

Referring particularly to Figs. 1, 2 and 3 of the drawing, there is schematically represented the fundamental method of forming a spring according to the invention. A length 1 of spring wire has one end secured, as to a post 2, and is adapted to be wound around the fixed pins 3, 4 and 5. In order that the spring convolutions when removed from the pins may remain parallel to one another, it has been found expedient to give the wire accurately predetermined angular sets around each pin. This angular set, of course, will be determined by the diameter of the wire and its natural resiliency. Assuming for the purpose of description that a convoluted equiangular triangular-shaped skewed spring is to be wound, such as shown in Figs. 4, 5 and 6, it is expedient that the said angular sets should be such that the wire naturally assumes an angle of sixty degrees between the adjacent legs of the triangle. For this purpose the pins 4 and 5 may be positioned at respective corners of an equilateral triangle and pin 3 may be positioned on a side of the equilateral triangle adjacent pin 4.

As shown in Fig. 1, the wire 1 is carried around pin 4 until it forms an "overbend" angle "a" with itself around said pin. This overbend angle "a" is determined by experiment with the particular size and temper of wire to be used, and with the particular tension and diameter of pins used, and is the angle necessary under these conditions to give a natural set of 60° to the wire. The wire is then carried back to the position shown by the dotted line (Fig. 1) to clear the pin 5.

As shown in Fig. 2 this same length of wire is then carried around pin 5 until it again forms the angle "a" with the preceding side 6 whereby it is given a natural set of 60°. The wire is carried back in order to clear pin 3 until it assumes the position shown in dotted lines (Fig. 2) and is then carried around pin 3, as shown in Fig. 3, to give it the proper set and natural bend of 60° around said pin.

It is thus seen that in this example the angles between adjacent sides of the convolution formed by bending the wire about the pins 3, 4 and 5, are each 60°, and that as successive convolutions are made they will also have 60° angles. The side 3—4 of each convolution, however, is shorter than the side 5—4, and the side 3—5 is also shorter than the side 5—4 but longer than the side 3—4. Thus there is a tendency for the angles between the sides 3—5 and 3—4 to assume an angle greater than 60°. But as each convolution leaves the pins, the angle between the sides 3—5 and 3—4 assumes its 60° set thus forming an equiangular triangle having unequal sides. In this way the skew is given to the spring, for the effective perpendicular height of the side 4—5, with respect to a reference plane which is perpendicular to the convolutions and which forms an angle with the spring axis equal to the complement of the angle of skew, is greater than the height of side 3—4 with respect to the same plane, and each succeeding convolution is placed below the prior one an amount equal to the said difference in height or the distances (Fig. 6). This process is repeated throughout the succeeding lengths of the wire, resulting in a convoluted spring which, as shown in Figs. 4 and 5 has its adjacent turns touching and offset a distance "S". When the spring shown in Figs. 4 and 5 is stretched the turns separate and assume the spacing and inclination shown in Fig. 6. A mathematical predetermination of the inclination or skewness to the common axis of the convolutions of the finished spring may be performed as follows: According to the intended use, the angle of skew, which the convolutions 7 and 8 (see Fig. 6) are to make with the common axis 9, when the desired spacing $d$ is made, is first determined. From this the dimension of the "slip" S (Fig. 5) may be determined, the "slip" S being the distance which one convolution is spaced below the preceding convolution. If the equiangular triangular spring, as shown in Fig. 4 is wound, the right-hand side of each convolution as viewed in Fig. 4, is longer than the left-hand side, by the chosen dimension of the "slip" S multiplied by the secant of the angle formed by the short side and said reference plane. In the example shown, the angle thus formed is one-half the angle between the two sides, or thirty degrees. In Figs. 4, 5 and 6, if the spacing $d$ between the convolutions is assumed to be one-eighth of an inch, and the inclination of the convolutions to the axis 9 to be approximately 45°, the dimension S is approximately 0.088 an inch. The secant of 30° is 1.154, and the dimension S multiplied by 1.154 is 0.105 an inch, which is the difference between the dimensions of sides 5—4 and 3—4. It is to be noted that the greater the difference between the right and left-hand sides of each convolution the greater the "slip", dimension S, and the greater the skew of the finished spring.

The above calculations are also readily determined by graphical methods. From the above calculations an equiangular triangular skew convoluted spring having a spacing $d$ between the convolutions equal to one-eighth of an inch, and having the individual convolutions inclined at an angle of 45° to the spring axis, may be formed with pin 3 separated from pin 4 approximately 0.648 an inch, a separation of approximately 0.750 an inch between pins 4 and 5, while pins 5 and 3 are approximately 0.699 an inch apart.

The sketch of Figure 8 shows the position of the reference plane above mentioned. In the sketch the convolutions of the spring are represented by the horizontal lines C. The spring axis is represented by the line A which passes through the convolutions C.

The angle of skew, L, is shown as the angle made by the convolutions C and the spring axis.

The reference plane, described as perpendicular to the plane of the convolutions and as forming an angle with the spring axis which is equal to the complement of the angle of skew, is represented in the sketch by line R and is shown forming with the axis A an angle B which is the complement of angle L, the angle of skew.

Should the pins be spaced equally a triangular spring would be produced but the individual turns thereof would not be displaced, as shown in Fig. 5, and when such a spring is stretched the convolutions would be substantially normal to the spring axis, and if a pressure is applied to such a non-skewed spring in a direction perpendicular to the spring axis it would in all probability result in a permanent deformation of the spring convolutions. On the other hand, with a skewed spring such as in Fig. 6 resulting from the stretching of the "slipped" spring of Figs. 4 and 5 the adjacent convolutions are in partial overlapping relation, and pressure normal to the spring axis 9 simply increases the tilt of the convolutions, which due to their resiliency, spring back to their normal skewed position without any deformation. It has been found that the inclination of the spring turns may be varied by changing the distance between pins 3—4 and 3—5 of Figs. 1, 2 and 3.

While the foregoing description has been given in connection with the formation of a triangular-shaped spring it will be obvious that a spring of any other shape may be wound in a similar manner by using the proper number of pins which are unequally spaced. If a rectangular skewed spring is wound, the "slip" S is the difference in length between the right and left-hand sides of the convolution. The pins as shown in Fig. 7 are set to enable the winding of a skewed rectangular spring of this class, the "slip" of which would be the difference between the dimensions $a$ and $b$.

The finished spring such as shown in Figs. 4, 5 and 6, while it may be used for a variety of purposes, is particularly well adapted to provide a resilient surface for laundry pressing or ironing machines since the adjacent convolutions overlap each other at an angle and therefore the spring is capable of substantial localized compression without danger of permanent deformation of the spring convolutions. Furthermore, the spring may be mounted on the press-supporting base so that the flat sides are adjacent and present a substantial, continuous and uniform surface suitable for supporting the pressing fabric. In this connection it may be noted that the resiliency of such a surface may be determined by the normal degree of slant of the spring convolutions.

While the method illustrated in Figs. 1, 2 and 3 accomplishes the "overbending" by carrying the wire around winding pins, it will be understood that the drawing is in this connection merely schematic. Therefore, instead of winding the wire 1 around fixed winding pins the wire may be fed forwardly in a straight line and given the required "overbend" at the predetermined points by special bending tools.

What I claim is:

1. The method of winding a convoluted spring having an angle of skew, comprising forming a length of wire into convolutions, and providing opposite sides of some of said convolutions with different net heights with respect to a reference plane which is perpendicular to the planes of the convolutions and which forms an angle with an axis of said spring which is equal to the complement of the angle of skew, the opposite sides of the same dimension recurring on the same side of the spring.

2. The method of winding a convoluted spring having an angle of skew from a length of wire, comprising successively dividing the length of wire into unitary lengths, and forming each unitary length into a convolution, and providing opposite sides of said convolutions with different net heights with respect to a reference plane which is perpendicular to the planes of the convolutions and which forms an angle with an axis of said spring which is equal to the complement of the angle of skew, the shorter of said sides reoccurring on the same side of said spring.

3. The method of winding a convoluted spring having an angle of skew from a length of wire, comprising successively dividing the length of wire into unitary lengths, and forming each unitary length into a convolution, and providing opposite sides of said convolutions with different net heights with respect to a reference plane which is perpendicular to the planes of the convolutions and which forms an angle with an axis of said spring which is equal to the complement of the angle of skew.

4. The method of winding a multiple-sided convoluted spring having an angle of skew, which comprises forming successive convolutions in overlapping displaced relation by providing opposite sides of said convolutions with unequal net heights with respect to a reference plane which is perpendicular to the planes of the convolutions and which forms an angle with an axis of said spring which is equal to the complement of the angle of skew.

5. The method of winding a convoluted spring having an angle of skew, comprising forming a length of wire into convolutions, and providing opposite sides of said convolutions with unequal net heights with respect to a reference plane which is perpendicular to the planes of the convolutions and which forms an angle with an axis of said spring which is equal to the complement of the angle of skew, and the said difference between the net heights determining the angle of skew.

6. The method of winding a convoluted spring having an angle of skew, comprising forming a length of wire into convolutions, and providing opposite sides of some of said convolutions with different net heights with respect to a reference plane which is perpendicular to the planes of the convolutions and which forms an angle with an axis of said spring which is equal to the complement of the angle of skew, whereby the spring receives a definite angle of skew as it is wound.

In testimony whereof, I have signed my name to this specification this 14th day of October 1929.

ARTHUR H. ADAMS.